United States Patent Office.

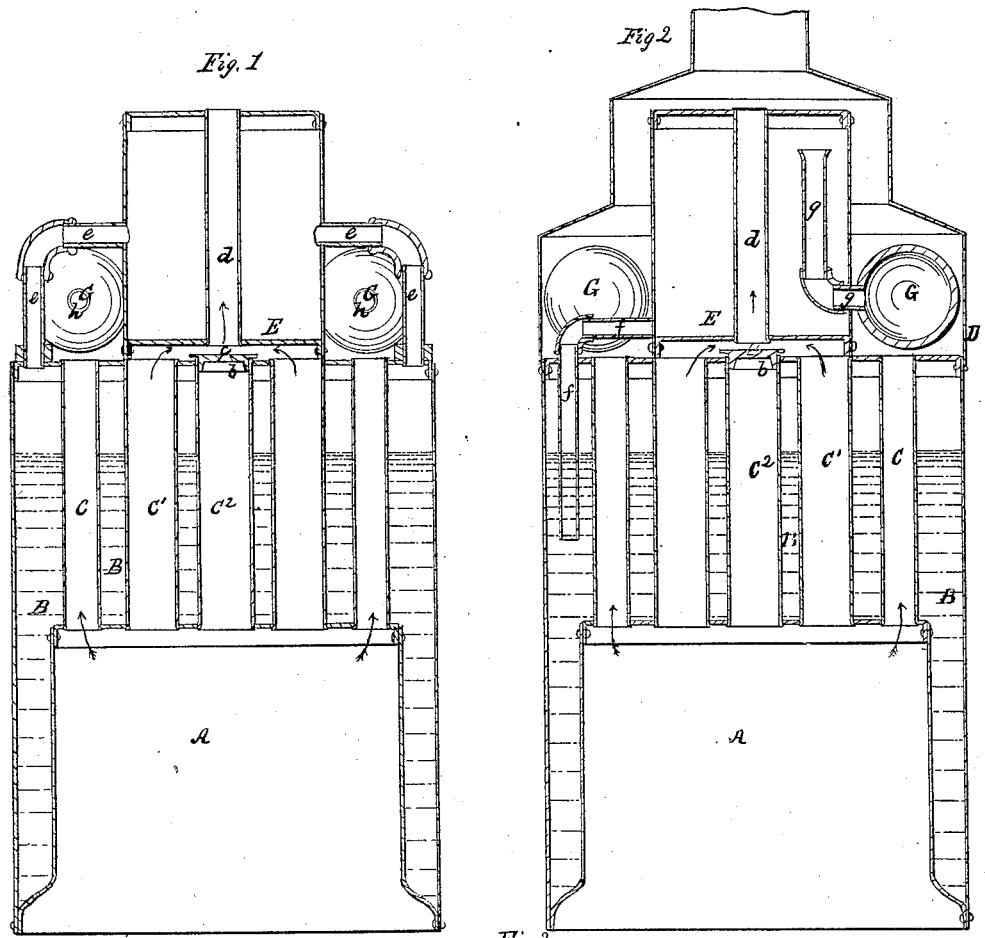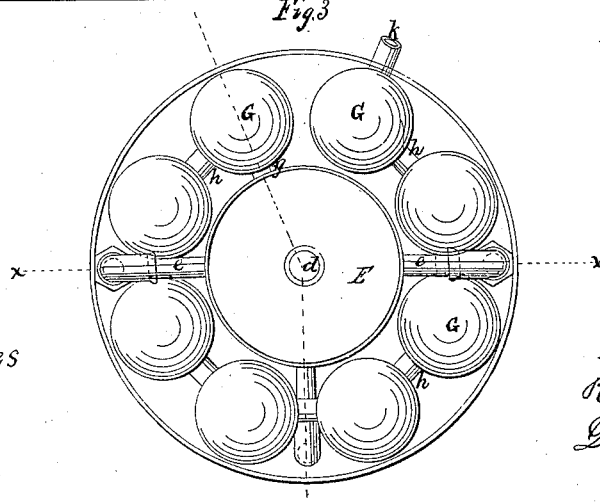

ROBERT W. DAVIS AND DANIEL DAVIS, OF LONG ISLAND CITY, NEW YORK.

*Letters Patent No. 63,226, dated March 26, 1867.*

---

IMPROVEMENT IN STEAM GENERATORS.

---

*The Schedule referred to in these Letters Patent and making part of the same.*

---

TO ALL WHOM IT MAY CONCERN:

Be it known that we, ROBERT W. DAVIS and DANIEL DAVIS, both of Long Island City, in the county of Queens, and State of New York, have invented a certain new and useful Improvement on Steam Boilers, of which the following is a full, clear, and exact description, reference being had to the accompanying drawing, in which—

Figure 1 represents a vertical section of a boiler constructed according to our improvement, taken through the line $x\ x$ in fig. 3, the smoke-box being removed.

Figure 2, a similar view through the line $z\ z$ in fig. 3, with smoke-box attached; and Figure 3, a plan of the same without the smoke-box.

Like letters indicate like parts throughout the several figures.

The nature of our invention consists in a novel arrangement of superheating spheres, disposed so as to form a circle above the body of the boiler and within the smoke-box, so connected and applied as to circulate or pass the steam successively through each sphere; and it further consists in a combination of the above with a central or upper steam-drying chamber, arranged within the smoke-box, and exposed to the draught for supplying said spheres with steam; also said invention further consists in a peculiar arrangement of fire-tubes and combustion-chambers in a vertical boiler, operating to throw the heat outwards, and whereby the greatest heat is brought to bear against the greatest body of water, so as to check or prevent foaming; likewise it consists in a combination with such arrangement of fire-tubes and combustion-chambers of an upper circular arrangement of superheating spheres, substantially as hereinbefore referred to.

Referring to the accompanying drawing, A represents the fire-box or chamber of a vertical steam boiler of cylindrical character, and within which may be arranged a grate of the description covered to us by Letters Patent of the United States bearing date April 17, 1866, or any other suitable grate. B B is the cylindrical water and steam-generating space of the boiler, arranged over the fire-box, and so as to surround the latter. C $C^1$ and $C^2$ are smoke or draught-tubes and heating-chambers, connecting the fire-chamber A with the smoke-box D. These tubes, of which there may be any number, are preferably arranged, the one, $C^2$, centrally over the fire-box, and the others, C $C^1$, in concentric circles; the outer one, C, being in more thorough or open communication with the smoke-box than the inner tubes, whereby the draught is quickest and more largely distributed through them, causing the heat to be thrown outwards, and the greatest heat brought to bear against the greatest body of water, which will tend to check or prevent foaming. Where a central tube, $C^2$, is used it may be wholly, or nearly so, a closed heating-chamber rather than a draught-tube, to prevent a central or direct escape of heat, and causing the latter to be more effectually projected outwards, for which purpose said central tube may be covered at its top by a cap, $b$, through which only a contracted aperture, $c$, (if any,) should be made. The inner row or series of smoke-tubes $C^1$ also have their outlets, in a measure, contracted, or direct draught from them checked, and which may be effected by a steam dome, E, or other chamber, arranged within the smoke-box and over the inner series of smoke-tubes, or other suitable cover equivalently arranged, and operating to contract the draught, which, so far as these tubes are concerned, may finally pass off up a tube, $d$, through said dome, that, by this arrangement, not only contributes to establish the greatest draught outwardly from the fire-box, but that is directly heated by the gases escaping with the draught, both beneath, internally, and externally. This steam-chamber or dome E, which may be of any suitable shape, differs from an ordinary steam dome in being of a close character, it only getting its supply of steam from the boiler by pipes $e$. It may further, however, be provided with a pipe, $f$, extending downwards into the water space to return any condensed steam in the dome back to the boiler. Situated as described, and acted on by the escaping heated gases, this dome becomes a steam-drying chamber, from which, preferably at or near the top, where the steam is dryest, the supply is taken by a pipe, $g$, to the superheating chambers. These superheating chambers consist of a series of spheres, G, arranged so as to form a circle outside the dome, within the smoke-box, and directly over the outer row of smoke-tubes C, through which the draught is strongest and greatest heat passes, that thus effectually contributes to the superheating of the steam in the spheres. The steam, supplied by the pipe $g$, is first passed to one of the spheres, and from thence, by connecting pipes $h$, to the other spheres in succession till arriving at the last in the circle, from whence it may be taken in a dry and superheated state by a pipe, $k$, to perform the work required of it.

What we claim as new, and desire to secure by Letters Patent, is—

1. The arrangement over the body of the boiler, and within the smoke-box, of a series or circle of superheating spheres G, connected and applied to circulate or pass the steam received from the boiler successively through them, substantially as specified.

2. The combination, with the steam-drying chamber or dome E, of a series or circle of superheating spheres G, both arranged within the smoke-box of a vertical boiler, for operation in connection with each other, and with a steam-generating space or chamber below, essentially as described.

3. The combination, with the smoke-box and body of the boiler, of an inner and outer series of smoke-tubes and combustion or heating-chambers, the inner series having their draught contracted relatively to the outer series, essentially as and for the purpose or purposes herein set forth.

4. The combination of the superheating spheres G, arranged as described, smoke-box D, and outer row or series of smoke-tubes C, arranged relatively to the spheres, substantially as specified.

R. W. DAVIS,
DANIEL DAVIS.

Witnesses:
   A. LE CLERC,
   G. W. REED.